US012737582B2

(12) United States Patent
Lu et al.

(10) Patent No.: US 12,737,582 B2
(45) Date of Patent: Sep. 15, 2026

(54) DATA STREAM-BASED COMPUTATION UNIT, ARTIFICIAL INTELLIGENCE CHIP, AND ACCELERATOR

(71) Applicant: Shenzhen Corerain Technologies Co., Ltd., Shenzhen (CN)

(72) Inventors: Chenchen Lu, Shenzhen (CN); Kuen Hung Tsoi, Shenzhen (CN); Xinyu Niu, Shenzhen (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 912 days.

(21) Appl. No.: 18/156,379

(22) Filed: Jan. 18, 2023

(65) Prior Publication Data

US 2023/0267300 A1 Aug. 24, 2023

(30) Foreign Application Priority Data

Feb. 23, 2022 (CN) ........................ 202210170027.X

(51) Int. Cl.

| | |
|---|---|
| ***G06N 3/02*** | (2006.01) |
| ***G06F 7/544*** | (2006.01) |
| ***G06F 9/30*** | (2018.01) |
| ***G06F 9/38*** | (2018.01) |
| ***G06F 17/15*** | (2006.01) |
| ***G06N 3/0464*** | (2023.01) |
| ***G06N 3/063*** | (2023.01) |
| ***G06N 20/00*** | (2019.01) |

(52) U.S. Cl.

CPC ............. *G06N 3/02* (2013.01); *G06F 7/5443* (2013.01); *G06F 9/30007* (2013.01); *G06F 17/153* (2013.01); *G06N 3/0464* (2023.01); *G06N 20/00* (2019.01); *G06F 9/38* (2013.01); *G06N 3/063* (2013.01); *Y02D 10/00* (2018.01)

(58) Field of Classification Search

CPC ............ G06N 3/02; G06N 3/04; G06N 3/044; G06N 3/0464; G06N 3/06; G06N 3/063; G06N 20/00; G06N 20/10; G06N 20/20; G06F 7/5443; G06F 9/30007; G06F 17/153; G06F 9/38; Y02D 10/00

See application file for complete search history.

(56) References Cited

U.S. PATENT DOCUMENTS

| | | | | |
|---|---|---|---|---|
| 2021/0256363 A1* | 8/2021 | Nair | ...................... | G06F 9/3013 |
| 2021/0319076 A1* | 10/2021 | Komuravelli | ......... | G06F 7/5443 |
| 2022/0261249 A1* | 8/2022 | Yu | ......................... | G06F 9/3016 |

* cited by examiner

*Primary Examiner* — Shane D Woolwine

(57) ABSTRACT

Disclosed are a data stream-based computation unit, an artificial intelligence chip, and an accelerator. The computation unit includes a plurality of computation circuits, each computation circuit including a first input terminal and a second input terminal, wherein M first input terminals of M computation circuits receive M pieces of first data required for a computation task on a one-to-one basis, where M≥2 and M is a positive integer; M second input terminals receive M pieces of second data distinct from each other required for the computation task on a one-to-one basis; the M computation circuits perform the computation task in parallel on the basis of the M pieces of first data and the M pieces of second data, wherein each computation circuit performs the computation task on the basis of one piece of first data and one piece of second data.

14 Claims, 6 Drawing Sheets

DATA STREAM-BASED COMPUTATION UNIT, ARTIFICIAL INTELLIGENCE CHIP, AND ACCELERATOR

CROSS REFERENCE TO RELATED APPLICATIONS

The present application claims the benefit of Chinese Patent Application No. 202210170027.X filed on Feb. 23, 2022, the contents of which are incorporated herein by reference in their entirety.

FIELD

The present disclosure relates to the technical field of artificial intelligence, and more particularly, to a data stream-based computation unit, an artificial intelligence chip, and an accelerator.

BACKGROUND

With the development of artificial intelligence, machine learning algorithms have been widely used in various fields. However, in the practical application of machine learning algorithms, it is usually necessary to compute a large volume of data, which requires a computation unit capable of performing a large number of computation tasks.

In the prior art, computations in machine learning algorithms are typically performed by instruction-set based computation units.

SUMMARY

Nonetheless, the inventors note that in the prior art the computation unit features a low computation speed.

Analyses show that such an instruction-set based computation unit can only perform one computation based on one piece of data in response to one instruction. Therefore, in a case where a computation task requires multiple computations based on multiple different pieces of data, an instruction set-based computation unit can only perform a next computation in response to a next instruction after completing a computation based on a current instruction. This serial computation mode leads to a lower computation speed of the computation unit.

To solve the above problem, the embodiments of the present disclosure provide the following technical solution.

In an aspect of the embodiments of the present disclosure, a data stream-based computation unit is provided, including a plurality of computation circuits, each computation circuit including a first input terminal and a second input terminal, wherein M first input terminals of M computation circuits in the plurality of computation circuits are configured to receive M pieces of first data required for performing a computation task on a one-to-one basis, where $M \geq 2$ and M is a positive integer; M second input terminals of the M computation circuits are configured to receive M pieces of second data distinct from each other required for performing the computation task on a one-to-one basis; the M computation circuits are configured to perform the computation task in parallel on the basis of the M pieces of first data and the M pieces of second data, wherein each computation circuit of the M computation circuits is configured to perform the computation task on the basis of one piece of first data and one piece of second data.

In some embodiments, the computation task is a computation in a neural network model.

In some embodiments, the computation task is a convolution, and the M pieces of first data are identical to each other; each piece of first data includes feature map data corresponding to one piece of convolution kernel data, and each piece of second data includes one piece of convolution kernel data.

In some embodiments, the feature map data includes feature map sub-data corresponding to N channels on a one-to-one basis, each piece of convolution kernel data includes weight data corresponding to N channels a one-to-one basis, either the feature map sub-data of each channel or the weight data of each channel is an $m \times n$ matrix, where $N \geq 2$, $n \geq 1$, $m \geq 1$, and N, m and n are all positive integers; at least one computation circuit of the M computation circuits includes: a plurality of multipliers, each multiplier of N multipliers in the plurality of multipliers being configured to multiply an element in an i-th row and a j-th column of the feature map sub-data of a corresponding channel by an element in an i-th row and a j-th column of the weight data of the corresponding channel to obtain a plurality of first computation results, wherein the N multipliers correspond to the feature map sub-data of N channels on a one-to-one basis and correspond to the weight data of N channels on a one-to-one basis, where $1 \leq i \leq m$, $1 \leq j \leq n$, and i and j are both positive integers; and an accumulator configured to perform an accumulation operation to obtain a result of the convolution, the accumulation operation including performing a first accumulation operation on the plurality of first computation results of each of the N multipliers.

In some embodiments, the accumulation operation further includes a second accumulation operation on a result of the first accumulation operation and a piece of bias data to obtain the result of the convolution.

In some embodiments, the accumulator includes: a first accumulator configured to perform N third accumulation operations to obtain N second computation results, wherein performing each third accumulation operation includes accumulating the plurality of first computation results of one multiplier of the N multipliers to obtain the second computation result; and a second accumulator configured to accumulate the N second computation results to obtain the result of the convolution.

In some embodiments, a number of the plurality of multipliers is P, where $16 \leq P \leq 256$, and P is a positive integer.

In another aspect of the embodiments of the present disclosure, an artificial intelligence chip is provided, including: the data stream-based computation unit according to any of the above embodiments; and a data buffer connected to the first input terminal and the second input terminal of the plurality of computation circuits and configured to transmit the M pieces of first data to the M computation circuits on a one-to-one basis and transmit the M pieces of second data to the M computation circuits on a one-to-one basis in response to a drive signal corresponding to the computation task.

In some embodiments, the data buffer is connected to the first input terminals of the plurality of computation circuits on a one-to-one basis via a first set of data paths, and is connected to the second input terminals of the plurality of computation circuits on a one-to-one basis via a second set of data paths; the artificial intelligence chip further includes: a switching circuit configured to control, in response to a control signal corresponding to the computation task, M data paths of at least one set of data paths of the first set of data paths and the second set of data paths that are connected to the M computation circuits to be conductive, other data paths being not conductive.

In some embodiments, the switching circuit includes a plurality of switches disposed on the at least one set of data paths on a one-to-one basis.

In yet another aspect of the embodiments of the present disclosure, an accelerator is provided, including the artificial intelligence chip according to any of the embodiments described above.

In still another aspect of the embodiments of the present disclosure, a data stream-based computation method is provided, including: receiving M pieces of first data required for performing a computation task on a one-to-one basis by M first input terminals of M computation circuits in a plurality of computation circuits, where $M \geq 2$ and M is a positive integer; receiving M pieces of second data distinct from each other required for performing the computation task on a one-to-one basis by M second input terminals of the M computation circuits; and performing the computation task in parallel on the basis of the M pieces of first data and the M pieces of second data by the M computation circuits, wherein each of the M computation circuits performs the computation tasks on the basis of one piece of first data and one piece of second data.

In some embodiments, the computation task is a computation in a neural network model.

In some embodiments, the computation task is a convolution, and the M pieces of first data are identical to each other; each piece of first data includes feature map data corresponding to one piece of convolution kernel data, and each piece of second data includes one piece of convolution kernel data.

In some embodiments, the feature map data includes feature map sub-data of N channels, the convolution kernel data includes weight data of N channels, either the feature map sub-data of each channel or the weight data of each channel is an $m \times n$ matrix, where $N \geq 2$, $n \geq 1$, $m \geq 1$, and N, m and n are all positive integers; at least one computation circuit of the M computation circuits includes a plurality of multipliers and an accumulator, and the at least one computation circuit performs the convolution in such a manner that each multiplier of N multipliers in the plurality of multipliers multiplies an element in an i-th row and a j-th column of the feature map sub-data of a corresponding channel by an element in an i-th row and a j-th column of the weight data of the corresponding channel to obtain a plurality of first computation results, wherein the N multipliers correspond to the feature map sub-data of N channels on a one-to-one basis and correspond to the weight data of N channels on a one-to-one basis, where $1 \leq i \leq m$, $1 \leq j \leq n$, and i and j are both positive integers; and an accumulator performs an accumulation operation to obtain a result of the convolution, the accumulation operation including performing a first accumulation operation on the plurality of first computation results of each of the N multipliers. In some embodiments, the accumulation operation further includes a second accumulation operation on a result of the first accumulation operation and a piece of bias data to obtain the result of the convolution.

In some embodiments, the accumulator includes a first accumulator and a second accumulator, the accumulator performing an accumulation operation to obtain a result of the convolution includes: performing N third accumulation operations to obtain N second computation results by the first accumulator, wherein performing each third accumulation operation includes accumulating the plurality of first computation results of one multiplier of the N multipliers to obtain the second computation result; and accumulating the N second computation results to obtain the result of the convolution by the second accumulator.

In some embodiments, a number of the plurality of multipliers is P, where $16 \leq P \leq 256$, and P is a positive integer.

In the embodiments of the present disclosure, the data stream-based computation unit includes the plurality of computation circuits, each of which may perform the computation task based on one piece of data received, i.e., one piece of first data and one piece of second data. As such, multiple computation circuits can perform the computation task in parallel on the basis of multiple different pieces of data, thereby increasing the computation speed of the computation unit.

The technical solution of the present disclosure is described in further detail below with reference to the accompanying drawings and embodiments.

BRIEF DESCRIPTION OF THE DRAWINGS

In order that the present disclosure or the technical solutions in the prior art are illustrated more clearly, a brief description will be given below with reference to the accompanying drawings which are used in the description of the embodiments or the prior art. Apparently, the drawings in the description below are only some of the embodiments of the present disclosure, and those of ordinary skill in the art can readily devise other drawings on such a basis without involving any inventive effort.

DETAILED DESCRIPTION

Various exemplary embodiments of the present disclosure will be described in detail with reference to the accompanying drawings. The description of these embodiments is merely exemplary in nature and is in no way intended to limit the present disclosure, or the application and uses thereof. This disclosure may be embodied in many different forms and should not be construed as limited to the embodiments set forth herein. These embodiments are provided so that this disclosure will be thorough and complete, and will fully convey the scope of the disclosure to those skilled in the art. It should be noted that the relative arrangement of parts and steps, components of materials, numerical expressions and values set forth in these embodiments are to be construed as merely illustrative rather than limiting unless otherwise specifically indicated.

Adjectives like "first" and "second" in this disclosure do not denote any order, quantity, or importance, but rather are used to distinguish one element from another. Verbs like "include" and "comprise" mean that an element preceding the verb covers elements listed after the verb and does not exclude the existence of other elements. Adjectives like "up" and "down" are used merely to indicate a relative positional relationship that may change accordingly when the absolute position of the object being described changes.

In this disclosure, when a particular component is described as being between a first component and a second component, there may or may not be an intermediate component between the particular component and the first component or the second component. When the particular element is described as being coupled to another element, the particular element may be directly coupled to the other element without the intermediate element or may be indirectly coupled to the other element through the intermediate element.

All terms, including technical or scientific terms, used in this disclosure have the same meaning as commonly understood by one of ordinary skill in the art to which this disclosure belongs, unless specifically defined otherwise. It will be further understood that terms, such as those defined in common dictionaries, should be interpreted as having a meaning that is consistent with their meaning in the context of the relevant art and will not be interpreted in an idealized or overly formal sense unless expressly so defined herein.

Techniques, methods, and devices known to those of ordinary skill in the relevant art may not be discussed in detail, but such techniques, methods, and devices should be considered part of the description where appropriate.

Figure 1:
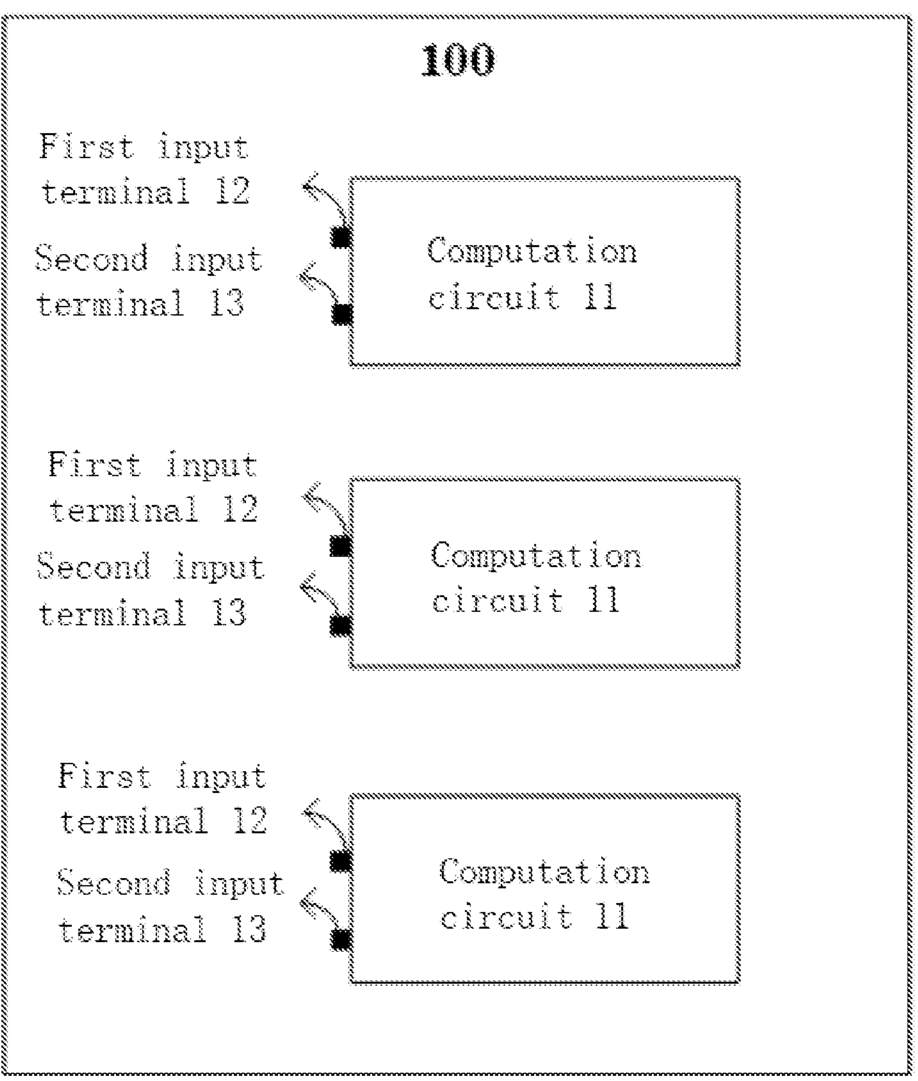
FIG. 1 is a block diagram of a data stream-based computation unit according to some embodiments of the present disclosure.

FIG. 1 is a block diagram of a data stream-based computation unit according to some embodiments of the present disclosure;

As shown in FIG. 1, the data stream-based computation unit 100 includes a plurality of computation circuits 11 (three are shown schematically in FIG. 1), each computation circuit 11 including a first input terminal 12 and a second input terminal 13.

M computation circuits 11 of the plurality of computation circuits 11 include M first input terminals 12 and M second input terminals 13. The M first input terminals 12 may be configured to receive M pieces of first data required for performing a computation task on a one-to-one basis, and the M second input terminals 13 may be configured to receive M pieces of second data distinct from each other required for performing the computation task on a one-to-one basis.

The M computation circuits 11 may be configured to perform the computation task in parallel on the basis of the M pieces of first data and the M pieces of second data. Here, each of the M computation circuits 11 is configured to perform the computation task on the basis of one piece of first data and one piece of second data. M is a positive integer greater than or equal to 2.

It should be understood that M is less than or equal to a number of the plurality of computation circuits 11. A value of M can be flexibly set according to a volume of data required for actually performing the computation task.

In some cases, the M pieces of first data received one-to-one by the M first input terminals 12 may be distinct from each other. In other cases, the M pieces of first data received by the M first input terminals 12 on a one-to-one basis may be identical to each other. This will be explained below in connection with some embodiments.

In the above embodiment, the data stream-based computation unit includes the plurality of computation circuits, each of which may perform the computation task based on one piece of data received, i.e., one piece of first data and one piece of second data. As such, multiple computation circuits can perform the computation task in parallel on the basis of multiple different pieces of data, thereby increasing the computation speed of the computation unit.

The data stream-based computation unit of FIG. 1 is further described below in connection with some embodiments.

In some embodiments, the computation task performed by the computation circuit 11 may be a computation in a neural network model. For example, the neural network model is a convolutional neural network model. In this case, the computation task may be, for example, a convolution or a bilinear interpolation.

Figure 2:
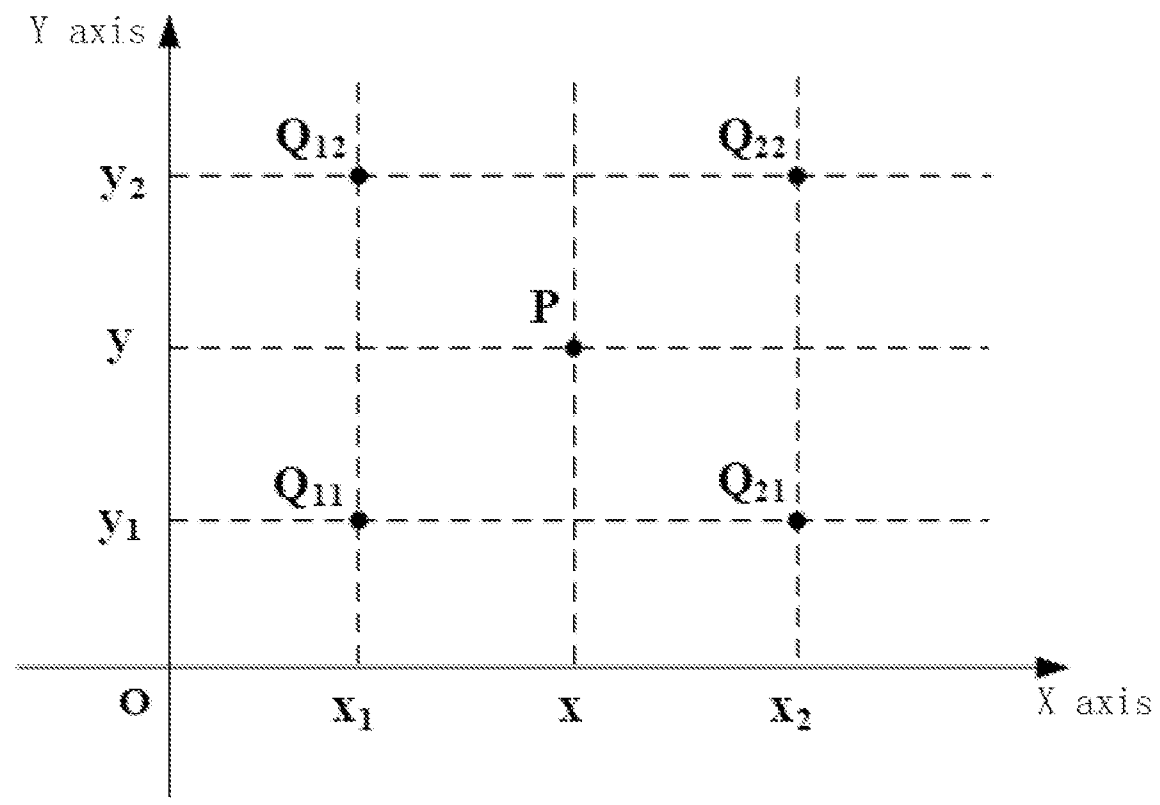
FIG. 2 is a graph of coordinates of pixel points for a bilinear interpolation according to some embodiments of the present disclosure.

FIG. 2 is a graph of coordinates of pixel points for a bilinear interpolation according to some embodiments of the present disclosure;

For example, in a case where the computation task is a bilinear interpolation, as shown in FIG. 2, Q11, Q12, Q21 and Q22 are all pixel points in an image before scaling, and P is a position point in the image before scaling corresponding to a target pixel point in the image after scaling. Herein, Q11, Q12, Q21 and Q22 are four pixel points closest to the position point P.

Coordinates of the position point P and the pixel points Q11, Q12, Q21 and Q22 are (x, y), (x1, y1), (x1, y2), (x2, y1) and (x2, y2), respectively, and pixel values of the pixel points Q11, Q12, Q21 and Q22 are f(Q11), f(Q12), f(Q21) and f(Q22), respectively.

A pixel value of the target pixel point in the image after scaling can be obtained by performing the bilinear interpolation according to the coordinates of the position point P, the coordinates of the four pixel points closest to the position point P (e.g., pixel points Q11, Q12, Q21 and Q22), and the pixel values of the four pixel points (e.g., the pixel values of pixel points Q11, Q12, Q21 and Q22). In this manner, the image can be scaled.

The computation can be performed according to the following bilinear interpolation formula to obtain a pixel value f(P) of the target pixel point in the image after scaling.

$$f(P) \approx f(Q11)(x2-x)(y2-y)+f(Q21)(x-x1)(y2-y)+f(Q12)(x2-x)(y-y1)+f(Q22)(x-x1)(y-y1)$$

It can be seen from the above formula that the data required for performing the bilinear interpolation to obtain the pixel value f(P) of one target pixel point includes a set of pixel values f(Q11), f(Q12), f(Q21), f(Q22) and a set of pixel values {(x2−x) (y2−y), (x−x1) (y2−y), (x2−x) (y−y1), and (x−x1) (y−y1)}.

In a case where pixel values of the three target pixel points need to be computed, the pixel values of the three target pixel points can be computed by three computation circuits 11 in the data stream-based computation unit 100 in parallel.

In this case, the three pieces of first data required for performing the bilinear interpolation may include three sets of pixel values distinct from each other. One piece of first data may include one set of pixel values. The three first input terminals 12 may be configured to receive three pieces of first data on a one-to-one basis.

Three pieces of second data required for performing the bilinear interpolation may include three sets of pixel values distinct from each other. One piece of second data may include one set of pixel values. The three second input terminals 13 may be configured to receive three pieces of second data on a one-to-one basis.

Each computation circuit 11 may perform the bilinear interpolation based on one set of pixel values and one set of pixel values.

For another example, in a case where the computation task is a convolution, M pieces of first data required for performing the convolution are identical to each other, each piece of first data may include feature map data corresponding to M pieces of convolution kernel data in a feature map, and each piece of second data of M pieces of second data distinct from each other required for performing the convolution may include one piece of convolution kernel data of M pieces of convolution kernel data.

It will be appreciated that data in one convolution window is equivalent to one piece of convolution kernel data. In one convolution, the computation should be performed for one piece of feature map data in the feature map according to the M pieces of convolution kernel data. For the convenience of description, the one piece of feature map data will be referred to as the feature map data corresponding to the M pieces of convolution kernel data in the embodiments of the present disclosure.

In a case where a number of pieces of convolution kernel data required for performing the convolution is two, that is, M is two, the convolution can be performed by two computation circuits 11 in the data stream-based computation unit 100 in parallel.

In this case, the two first input terminals 12 of the two computation circuits 11 may be configured to receive two pieces of feature map data identical to each other on a one-to-one basis. The two second input terminals 13 of the two computation circuits 11 may be configured to receive two pieces of convolution kernel data distinct from each other on a one-to-one basis. Each computation circuit 11 may be configured to perform the convolution based on one piece of feature map data and one piece of convolution kernel data.

In some embodiments, each of the M pieces of feature map data required for performing the convolution may include feature map sub-data of N channels, and accordingly, each piece of convolution kernel data may include weight data of N channels. Either the feature map sub-data of each channel or the weight data of each channel can be an m×n matrix, where N⩾ 2, n⩾ 1, m⩾ 1, and N, m and n are all positive integers.

The inventors also note that machine learning algorithms typically involve a large number of convolutions. However, in the case where the computation task is the convolution, in the related art, only after the convolution for one channel is completed on the basis of the feature map sub-data of the one channel and the corresponding weight data of the one channel, can the convolution for another channel be performed on the basis of the feature map sub-data of the other channel and the corresponding weight data of the other channel, which further limits the computation speed of the computation unit.

On this basis, the present disclosure also provides the following technical solution.

Figure 3:
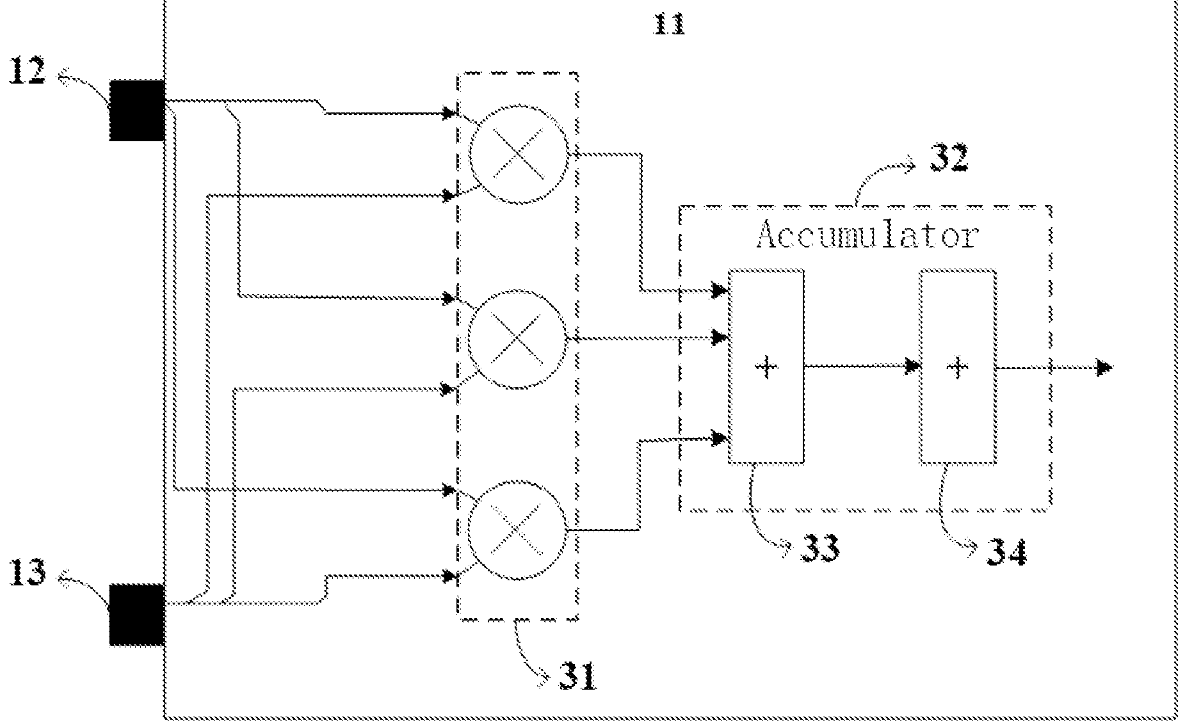
FIG. 3 is a schematic diagram of a structure of a computation circuit according to some embodiments of the present disclosure.

FIG. 3 is a schematic diagram of a structure of a computation circuit according to some embodiments of the present disclosure;

At least one of the M computation circuits 11 may include the structure shown in FIG. 3.

As shown in FIG. 3, the computation circuit 11 includes a plurality of multipliers 31 (three are shown schematically in FIG. 3) and an accumulator 32. The accumulator 32 may be one accumulator or may include multiple accumulators. This will be explained below in connection with some embodiments.

N multipliers 31 of the plurality of multipliers 31 correspond to the feature map sub-data of N channels on a one-to-one basis, and correspond to the weight data of N channels on a one-to-one basis.

Figure 4:
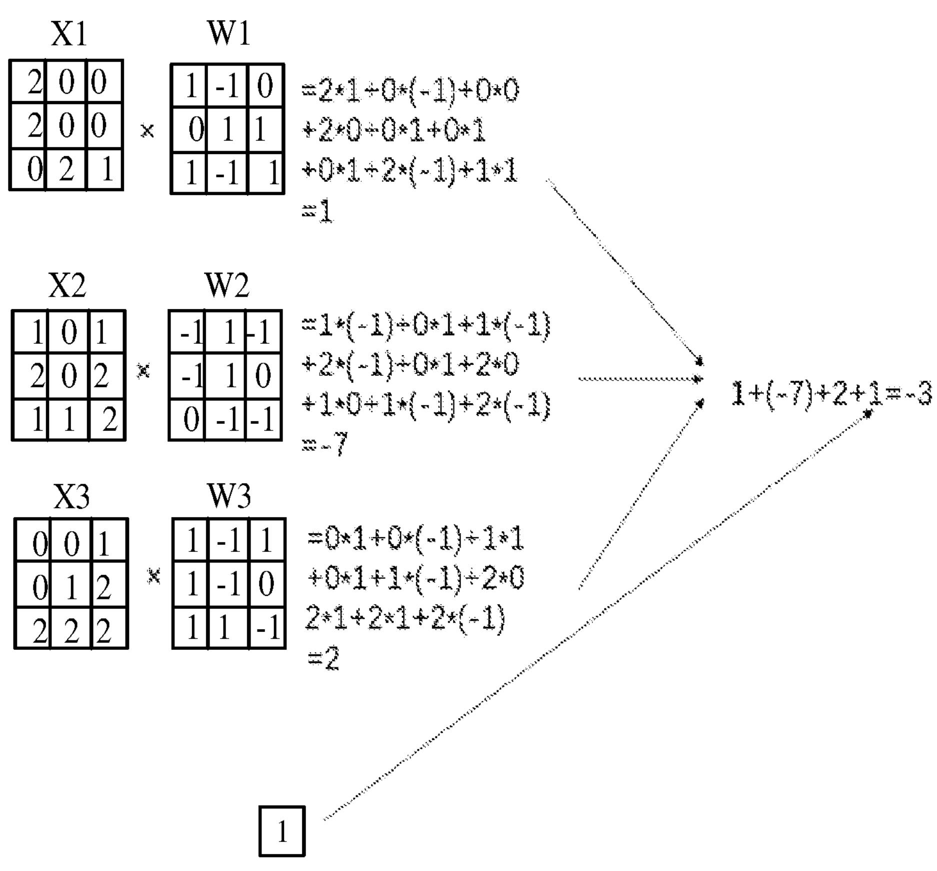
FIG. 4 is a schematic diagram of a computation process for a convolution according to some embodiments of the present disclosure.

For example, as shown in FIG. 4, each multiplier 31 may be connected to the first input terminal 12 and the second input terminal 13 through two data paths, respectively, so as to receive the feature map sub-data of a corresponding channel input via the first input terminal 12 and the weight data of the corresponding channel input via the second input terminal 13.

Each multiplier 31 of the N multipliers 31 may be configured to multiply an element in an i-th row and a j-th column of the feature map sub-data of a corresponding channel by an element in an i-th row and a j-th column of the weight data of the corresponding channel to obtain a plurality of first computation results, where 1⩽ i⩽ m, 1⩽ j⩽ n, and i and j are both positive integers.

The accumulator 32 may be configured to perform an accumulation operation to obtain a result of the convolution.

Here, the accumulation operation may include performing a first accumulation operation on the plurality of first computation results of each multiplier 31 of the N multipliers 31.

For example, as shown in FIG. 3, each multiplier 31 may be connected to the accumulator 32 via a data path such that the accumulator 32 may receive the plurality of first computation results output by each multiplier 31. If the plurality of first computation results of each multiplier 31 are treated as a set of computation results, the accumulator 32 may perform the first accumulation operation on N sets of computation results of N multipliers 31.

In the above embodiment, in the case where the computation task is the convolution, at least one of the M computation circuits may include a plurality of multipliers and an accumulator. Each multiplier may multiply the element in the i-th row and the j-th column of the feature map sub-data of a corresponding channel by the element in the i-th row and the j-th column of the weight data of the corresponding channel to obtain the plurality of first computation results. The accumulator may perform the accumulation operation based on the computation results of the plurality of multipliers to obtain the result of the convolution. In this manner, the plurality of multipliers can perform multi-channel convolutions in parallel according to the feature map sub-data of the plurality of channels and the weight data of the plurality of channels, thereby further improving the computation speed of the computation unit.

In some embodiments, the accumulation operation performed by the accumulator 32 may further include performing a second accumulation operation on the result of the first accumulation operation and a piece of bias data to obtain the result of the convolution. For example, the accumulator 32 may further receive the bias data via another data path (not shown in FIG. 3) such that the second accumulation operation may be performed on the result of the first accumulation operation and the bias data to obtain the result of the convolution.

It will be appreciated that where the data required for performing the convolution does not include the bias data, the result of the first accumulation operation performed by accumulator 32 is the result of the convolution.

The computation circuit shown in FIG. 3 is further described below with reference to the convolution shown in FIG. 4.

FIG. 4 is a schematic diagram of a computation process for a convolution according to some embodiments of the present disclosure;

As shown in FIG. 4, the feature map data includes feature map sub-data of three channels, namely, X1, X2 and X3, the convolution kernel data includes weight data of three channels, namely, W1, W2 and W3, and the bias data is 1.

In a case where the convolution shown in FIG. 4 is performed by the computation circuit 11 shown in FIG. 3, the three multipliers 31 and the accumulator 32 in the computation circuit 11 may be configured as follows.

A first multiplier 31 may be configured to multiply an element in the i-th row and the j-th column of the feature map sub-data of a first channel, namely, X1, by an element in the i-th row and the j-th column of the weight data of the first channel, namely, W1, to obtain a plurality of first computation results. For example, the plurality of first computation results of the first multiplier 31 may include 2*1, 0*(1), 0*0, and 2*0, etc.

A second multiplier 31 may be configured to multiply an element in the i-th row and the j-th column of the feature map sub-data of a second channel, namely, X2, by an element in the i-th row and the j-th column of the weight data of the second channel, namely, W2, to obtain a plurality of first computation results. For example, the plurality of first computation results of the second multiplier 31 may include 1*(−1), 0*1, 2*(−1), 1*0, etc.

A third multiplier 31 may be configured to multiply an element in the i-th row and the j-th column of the feature map sub-data of a third channel, namely, X3, by an element in the i-th row and the j-th column of the weight data of the third channel, namely, W3, to obtain a plurality of first computation results. For example, the plurality of first computation results of the third multiplier 31 may include 0*1, 0*(−1), 1*1 and 1*(−1), etc.

The accumulator 32 may be configured to perform an accumulation operation on the plurality of first computation results of each multiplier 31 of the three multipliers 31 and the bias data to obtain the result of the convolution.

For example, the accumulator 32 may first perform the first accumulation operation on the plurality of first computation results of each multiplier 31 to obtain a result as −4. The accumulator 32 may then perform the second accumulation operation on the result of the first accumulation operation, i.e., −4, and the bias data, i.e., 1, to obtain the result of the convolution as −3.

In some embodiments, with continued reference to FIG. 3, the accumulator 32 may include a first accumulator 33 and a second accumulator 34. For example, each multiplier 31 may be connected to the first accumulator 33 via a data path, so that the first accumulator 33 may receive the plurality of first computation results output by each multiplier 31; the first accumulator 33 may be connected to the second accumulator 34 via a data path such that the second accumulator 34 may receive a computation result output by the first accumulator 33.

In this case, the first accumulator 33 may be configured to perform N third accumulation operations to obtain N second computation results. The second accumulator 34 may be configured to accumulate the N second computation results to obtain the result of the convolution. Performing each third accumulation operation may include accumulating the plurality of first computation results of one of the N multipliers 31 to obtain the second computation result.

Taking the convolution shown in FIG. 4 as an example, performing a 1st third accumulation operation by the first accumulator 33 may include accumulating the plurality of first computation results of the first multiplier 31 to obtain a second computation result as 1; performing a 2nd third accumulation operation by the first accumulator 33 may include accumulating the plurality of first computation results of the second multiplier 31 to obtain a second computation result as −7; performing a 3rd third accumulation operation by the first accumulator 33 may include accumulating the plurality of first computation results of the third multiplier 31 to obtain a second computation result as 2. As such, the first accumulator 33 performs three third accumulation operations to obtain three second computation results.

The second accumulator 34 may accumulate the three second computation results (i.e., 1, −7, and 2) to obtain the result of the convolution as 1+(−7)+2=−4.

It will be appreciated that where the data required for performing the convolution further includes the bias data, the second accumulator 34 may further be configured to accumulate the N second computation results and the bias data to obtain the result of the convolution. For example, the second accumulator 34 may accumulate the three second computation results and the bias data to obtain the result of the convolution as −3.

In some embodiments, a number of the plurality of multipliers 31 may be P, where 16≤P≤256, and P is a positive integer. For example, P is 32, 64, 128, or 200, etc.

Figure 5:
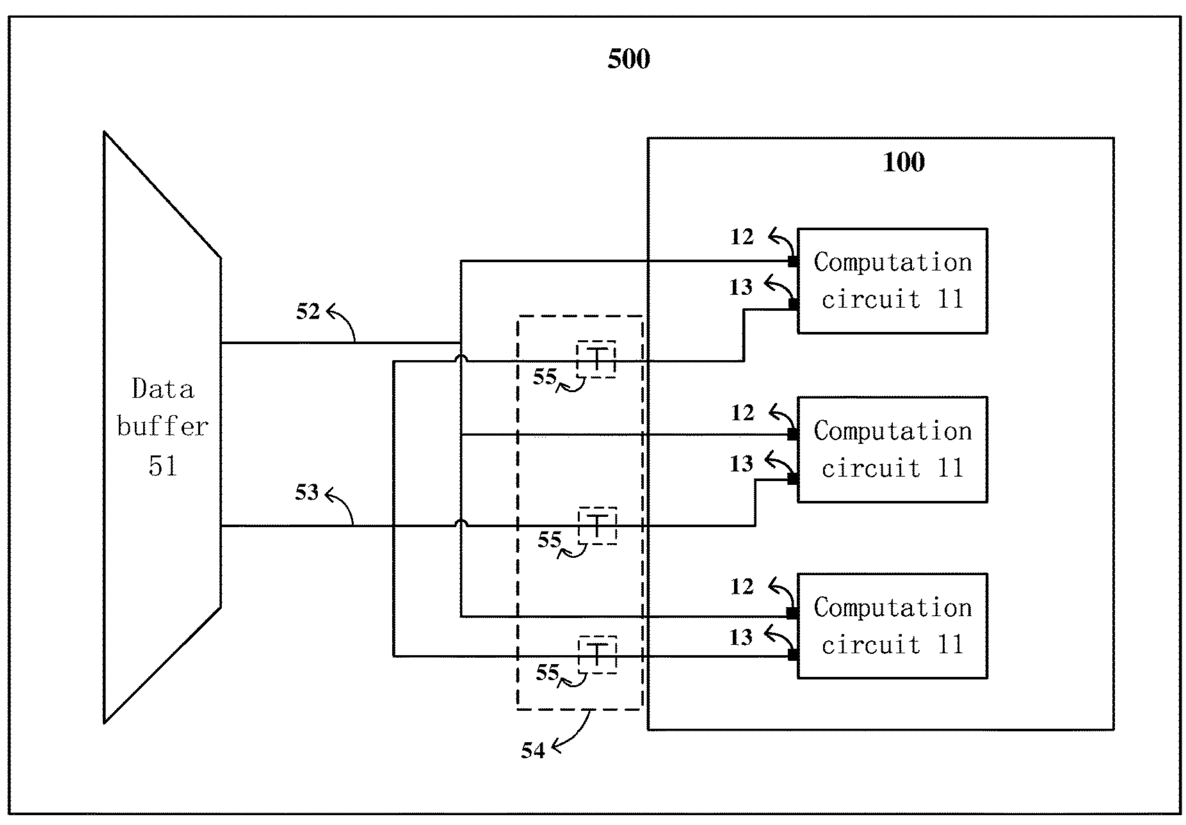
FIG. 5 is a schematic diagram of a structure of an artificial intelligence chip according to some embodiments of the present disclosure.

FIG. 5 is a schematic diagram of a structure of an artificial intelligence chip according to some embodiments of the present disclosure;

As shown in FIG. 5, an artificial intelligence chip 500 includes the data stream-based computation unit according to any of the embodiments described above (e.g., data stream-based computation unit 100) and a data buffer 51. The data buffer 51 may be connected to the first input terminal 12 and the second input terminal 13 of the plurality of computation circuits 11.

The data buffer 51 may be configured to transmit M pieces of first data to M computation circuits 11 on a one-to-one basis and M pieces of second data to the M computation circuits 11 on a one-to-one basis in response to a drive signal corresponding to the computation task.

For example, the data buffer 51 may be configured to transmit M pieces of feature map data identical to each other to the M computation circuits 11 on a one-to-one basis and M pieces of convolution kernel data distinct from each other to the M computation circuits 11 on a one-to-one basis in response to the drive signal corresponding to convolution.

In some embodiments, as shown in FIG. 5, the data buffer 51 may be connected on a one-to-one basis to the first input terminals 12 of the plurality of computation circuits 11 (three are schematically shown in FIG. 5) in the data stream-based computation unit 100 through a first set of data paths 52, and may be connected on a one-to-one basis to the second input terminals 13 of the plurality of computation circuits 11 through a second set of data paths 53.

In this case, the artificial intelligence chip 500 may further include a switching circuit 54.

In some embodiments, the switching circuit 54 may be configured to control, in response to a control signal corresponding to the computation task, M data paths of at least one set of data paths of the first set of data paths 52 and the second set of data paths 53 that are connected to the M computation circuits to be conductive, and other data paths than the M data paths of the at least one set of data paths to be not conductive.

For example, where only two of the three computation circuits 11 are configured to perform the computation task in parallel, each data path of the second set of data paths 53 connected to the three computation circuits 11 is conductive. In this case, the switching circuit 54 may control two data paths of the first set of data paths 52 connected to the two computation circuits 11 to be conductive and one data path connected to the remaining one of the computation circuits 11 to be not conductive in response to the control signal corresponding to the computation task.

In this case, even if the data path connected to the remaining one of the computation circuits 11 in the second set of data paths 53 is conductive, the remaining one of the computation circuits 11 will not be able to receive the data required for performing the computation task because the path connected to the remaining one of the computation circuits 11 in the first set of data paths 52 is not conductive, as a result, the remaining one of the computation circuits 11 will not work.

Therefore, in the case where M computation circuits of the plurality of computation circuits are configured to perform the computation task in parallel, the M data paths connected to the M computation circuits can be controlled to be conductive by the switching circuit, and since none of the other computation circuits of the plurality of computation circuits than the M computation circuits is conductive, the other computation circuits do not receive corresponding data and work, thereby reducing power consumption of the chip.

In some implementations, the switching circuit 54 may include a plurality of switches 55. The plurality of switches 55 may be disposed on at least one set of data paths of the first set of data paths 52 and the second set of data paths 53 on a one-to-one basis.

For example, as shown in FIG. 5, the plurality of switches 55 may be disposed on the second set of data paths 53 on a one-to-one basis. Each data path of the first set of data paths 52 is conductive. In the case where the computation task is performed by two computation circuits in parallel, the switching circuit 54 may control, in response to the control signal corresponding to the computation task, the two switches 55 on the two data paths of the second set of data paths 53 connected to the two computation circuits 11 to be closed, and the switch 55 on the one data path connected to the remaining one computation circuit 11 to be opened, such that the two data paths are conductive and the remaining one data path is not conductive. At this time, the two second input terminals 13 of the two computation circuits 11 can receive two pieces of second data distinct from each other on a one-to-one basis through the two conductive data paths, and the two first input terminals 12 can directly receive two pieces of first data required for performing the computation task on a one-to-one basis through two data paths connected to the two computation circuits 11 in the first set of data paths 52.

Embodiments of the present disclosure further provide an accelerator, including the artificial intelligence chip according to any of the embodiments described above (e.g., the artificial intelligence chip 500).

A data stream-based computation method according to some embodiments of the present disclosure are described below in conjunction with FIGS. 6 to 8.

Figure 6:
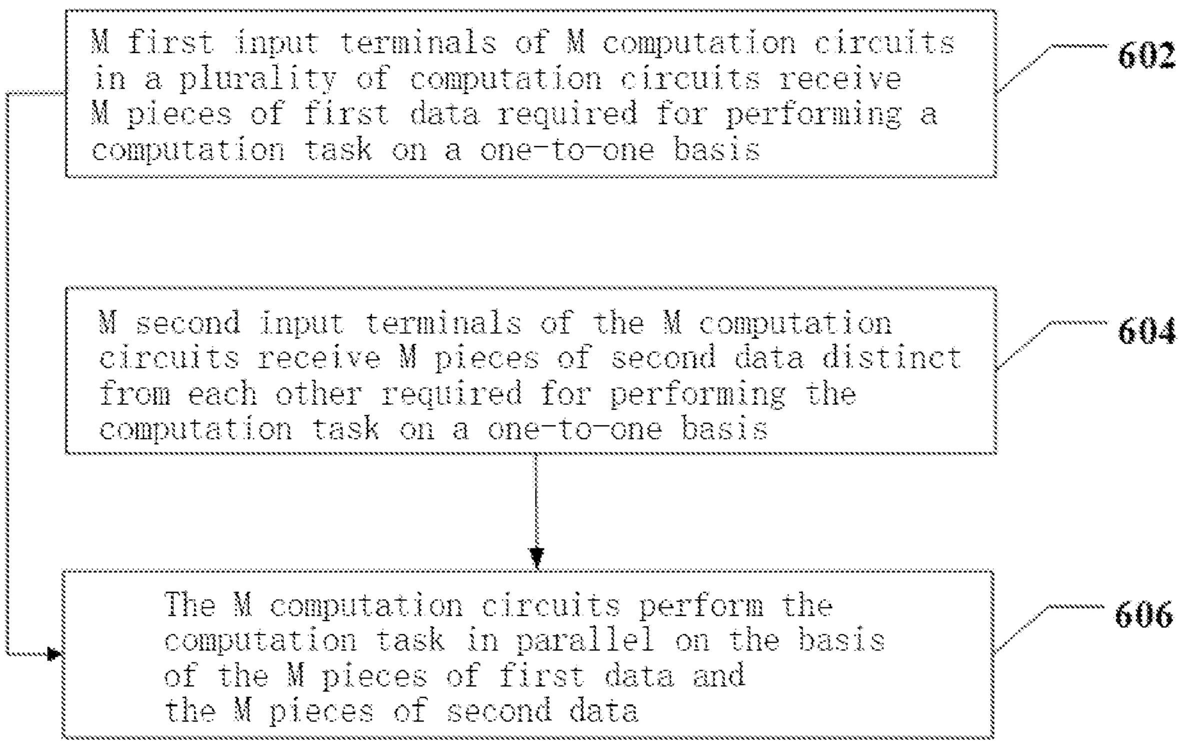
FIG. 6 is a flow chart of a data stream-based computation method according to some embodiments of the present disclosure.

FIG. 6 is a flow chart of a data stream-based computation method according to some embodiments of the present disclosure;

In step 602, M first input terminals of M computation circuits in a plurality of computation circuits receive M pieces of first data required for performing a computation task on a one-to-one basis.

Here, M is a positive integer greater than or equal to 2.

In step 604, M second input terminals of the M computation circuits receive M pieces of second data distinct from each other required for performing the computation task on a one-to-one basis.

In step 606, the M computation circuits perform the computation task in parallel on the basis of the M pieces of first data and the M pieces of second data.

Here, each computation circuit of the M computation circuits may perform the computation task based on one piece of first data and one piece of second data.

A detailed description of the method shown in FIG. 6 can be found in relation to the embodiment of the data stream-based computation unit shown in FIG. 1 and will not be described in detail here.

In the case where the computation task is a convolution, the M pieces of first data required for performing the computation task may be identical to each other. Each piece of first data may include feature map data corresponding to M pieces of convolution kernel data in a feature map, and each piece of second data may include one of the M pieces of convolution kernel data.

In this case, each feature map data may include feature map sub-data of N channels and each piece of convolution kernel data may include weight data of N channels. Either the feature map sub-data of each channel or the weight data of each channel can be an m×n matrix, where $N \geqslant 2$, $n \geqslant 1$, $m \geqslant 1$, and N, m and n are all positive integers.

Figure 7:
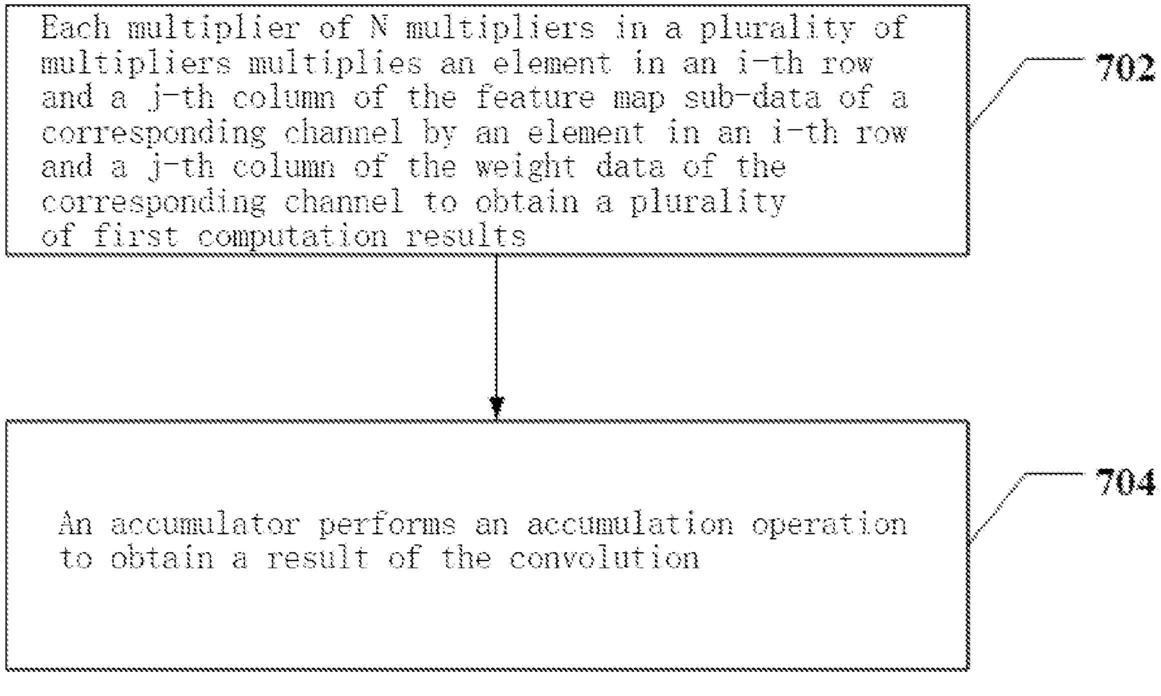
FIG. 7 is a flow chart of some implementations of step 606 shown in FIG. 6.

In some implementations of step 606, at least one computation circuit of the M computation circuits may include a plurality of multipliers and an accumulator, and the at least one computation circuit may perform the convolution according to the method illustrated in FIG. 7.

FIG. 7 is a flow chart of some implementations of step 606 shown in FIG. 6;

In step 702, each multiplier of N multipliers in the plurality of multipliers multiplies an element in an i-th row and a j-th column of the feature map sub-data of a corresponding channel by an element in an i-th row and a j-th column of the weight data of the corresponding channel to obtain a plurality of first computation results.

Similarly, the N multipliers correspond on a one-to-one basis with the feature map sub-data of N channels and on a one-to-one basis with the weight data of the N channels, where $1 \leqslant i \leqslant m$, $1 \leqslant j \leqslant n$, i and j are positive integers.

In step 704, the accumulator performs an accumulation operation to obtain a result of the convolution.

Similarly, the accumulation operation may include performing a first accumulation operation on the plurality of first computation results of each of the N multipliers.

In some embodiments, the accumulation operation performed by the accumulator may further include performing a second accumulation operation on a result of the first accumulation operation and a piece of bias data to obtain the result of the convolution.

In some implementations of step 704, the accumulator may include a first accumulator and a second accumulator. In this case, the convolution may be performed as shown in FIG. 8.

Figure 8:
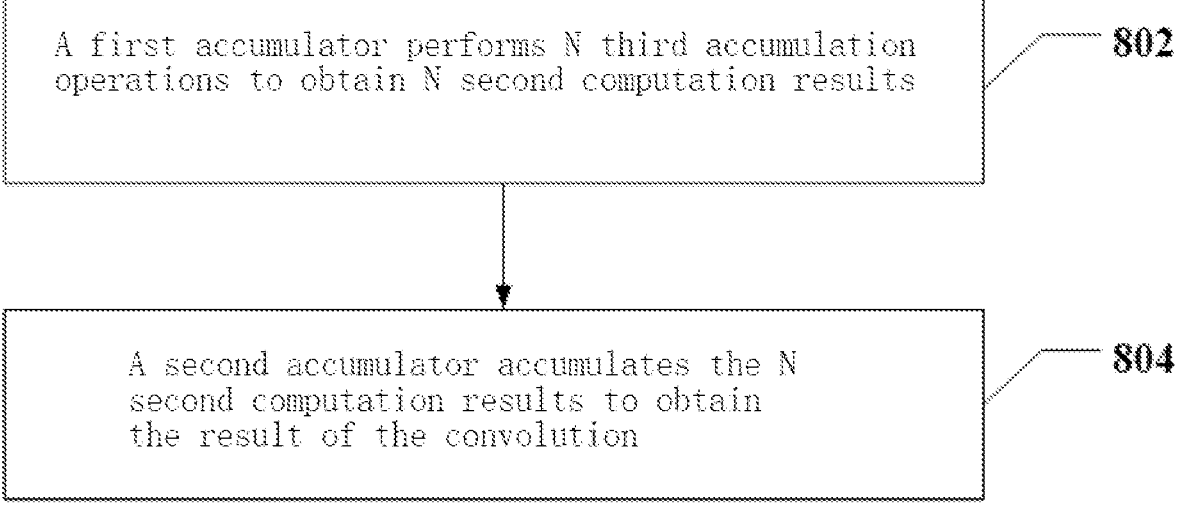
FIG. 8 is a flow chart of some implementations of step 704 shown in FIG. 7.

FIG. 8 is a flow chart of some implementations of step 704 shown in FIG. 7.

In step 802, the first accumulator performs N third accumulation operations to obtain N second computation results.

Similarly, performing each third accumulation operation includes accumulating the plurality of first computation results of one of the N multipliers to obtain the second computation result.

In step 804, the second accumulator accumulates the N second computation results to obtain the result of the convolution.

A detailed description of the method shown in FIGS. 7 and 8 can be found in relation to the embodiment of the computation circuit shown in FIG. 3 and will not be described in detail here.

Various embodiments of the present disclosure are described in detail above. To avoid obscuring the concepts of the present disclosure, some details known in the art are not described. From the above description, those skilled in the art will fully understand how to implement the technical solutions disclosed herein.

While specific embodiments of the disclosure are described in detail by way of example, it will be understood by those skilled in the art that the foregoing examples are illustrative only and are not intended to limit the scope of the disclosure. It will be appreciated by those skilled in the art that changes may be made to the above embodiments or equivalent substitutions of elements herein may be made without departing from the scope and spirit of the disclosure. The scope of the disclosure is defined by the appended claims.

What is claimed is:

1. A data stream-based computation unit, comprising a plurality of computation circuits, each computation circuit comprising a first input terminal and a second input terminal, wherein, M first input terminals of M computation circuits in the plurality of computation circuits are configured to receive M pieces of first data required for performing a computation task on a one-to-one basis, where M≥2 and M is a positive integer;

M second input terminals of the M computation circuits are configured to receive M pieces of second data distinct from each other required for performing the computation task on a one-to-one basis; and the M computation circuits are configured to perform the computation task in parallel on the basis of the M pieces of first data and the M pieces of second data, wherein each computation circuit of the M computation circuits is configured to perform the computation task on the basis of one piece of first data and one piece of second data, wherein the computation task is a computation in a neural network model, wherein the computation task is a convolution, and the M pieces of first data are identical to each other, and wherein each piece of first data comprises feature map data corresponding to M pieces of convolution kernel data in a feature map, and each piece of second data comprises one of the M pieces of convolution kernel data.

2. The computation unit according to claim 1, wherein the feature map data comprises feature map sub-data of N channels, each piece of convolution kernel data comprises weight data of N channels, either the feature map sub-data of each channel or the weight data of each channel is an m×n matrix, where N≥2, n≥1, m≥1, and N, m and n are all positive integers;

at least one computation circuit of the M computation circuits comprises:

a plurality of multipliers, each multiplier of N multipliers in the plurality of multipliers being configured to multiply an element in an i-th row and a j-th column of the feature map sub-data of a corresponding channel by an element in an i-th row and a j-th column of the weight data of the corresponding channel to obtain a plurality of first computation results, wherein the N multipliers correspond to the feature map sub-data of N channels on a one-to-one basis and correspond to the weight data of N channels on a one-to-one basis, where 1≤i≤m, 1≤j≤n, and i and j are both positive integers; and an accumulator configured to perform an accumulation operation to obtain a result of the convolution, the accumulation operation comprising performing a first accumulation operation on the plurality of first computation results of each of the N multipliers.

3. The computation unit according to claim 2, wherein the accumulation operation further comprises a second accumulation operation on a result of the first accumulation operation and a piece of bias data to obtain the result of the convolution.

4. The computation unit according to claim 2, wherein the accumulator comprises:

a first accumulator configured to perform N third accumulation operations to obtain N second computation results, wherein performing each third accumulation operation comprises accumulating the plurality of first computation results of one multiplier of the N multipliers to obtain the second computation result; and a second accumulator configured to accumulate the N second computation results to obtain the result of the convolution.

5. The computation unit according to claim 2, wherein a number of the plurality of multipliers is P, where 16≤P≤256, and P is a positive integer.

6. An artificial intelligence chip, comprising:

the data stream-based computation unit according to claim 1; and a data buffer connected to the first input terminal and the second input terminal of the plurality of computation circuits and configured to transmit the M pieces of first data to the M computation circuits on a one-to-one basis and transmit the M pieces of second data to the M computation circuits on a one-to-one basis in response to a drive signal corresponding to the computation task.

7. The artificial intelligence chip according to claim 6, wherein the data buffer is connected to the first input terminals of the plurality of computation circuits on a one-to-one basis via a first set of data paths, and is connected to the second input terminals of the plurality of computation circuits on a one-to-one basis via a second set of data paths; the artificial intelligence chip further comprises:

a switching circuit configured to control, in response to a control signal corresponding to the computation task, M data paths of at least one set of data paths of the first set of data paths and the second set of data paths that are connected to the M computation circuits to be conductive, other data paths being not conductive.

8. The artificial intelligence chip according to claim 7, wherein the switching circuit comprises a plurality of switches disposed on the at least one set of data paths on a one-to-one basis.

9. An accelerator, comprising:

the artificial intelligence chip according to claim 6.

10. A data stream-based computation method, comprising:

receiving M pieces of first data required for performing a computation task on a one-to-one basis by M first input terminals of M computation circuits in a plurality of computation circuits, where M≥2 and M is a positive integer;

receiving M pieces of second data distinct from each other required for performing the computation task on a one-to-one basis by M second input terminals of the M computation circuits; and performing the computation task in parallel on the basis of the M pieces of first data and the M pieces of second data by the M computation circuits, wherein each of the M computation circuits performs the computation tasks on the basis of one piece of first data and one piece of second data, wherein the computation task is a computation in a neural network model, wherein the computation task is a convolution, and the M pieces of first data are identical to each other, and wherein each piece of the first data comprises feature map data corresponding to M pieces of convolution kernel data in a feature map, and each piece of the second data comprises one of the M pieces of convolution kernel data.

11. The method according to claim 10, wherein the feature map data comprises feature map sub-data of N channels, each piece of convolution kernel data comprises weight data of N channels, either the feature map sub-data of each channel or the weight data of each channel is an m×n matrix, where N≥2, n≥1, m≥1, and N, m and n are all positive integers;

at least one computation circuit of the M computation circuits comprises a plurality of multipliers and an accumulator, and the at least one computation circuit performs the convolution in such a manner that each multiplier of N multipliers in the plurality of multipliers multiplies an element in an i-th row and a j-th column of the feature map sub-data of a corresponding channel by an element in an i-th row and a j-th column of the weight data of the corresponding channel to obtain a plurality of first computation results, wherein the N multipliers correspond to the feature map sub-data of N channels on a one-to-one basis and correspond to the weight data of N channels on a one-to-one basis, where 1≤i≤m, 1≤j≤n, and i and j are both positive integers; and an accumulator performs an accumulation operation to obtain a result of the convolution, the accumulation operation comprising performing a first accumulation operation on the plurality of first computation results of each of the N multipliers.

12. The method according to claim 11, wherein the accumulation operation further comprises a second accumulation operation on a result of the first accumulation operation and a piece of bias data to obtain the result of the convolution.

13. The method according to claim 11, wherein the accumulator comprises a first accumulator and a second accumulator, the accumulator performing an accumulation operation to obtain a result of the convolution comprises:

performing N third accumulation operations to obtain N second computation results by the first accumulator, wherein performing each third accumulation operation comprises accumulating the plurality of first computation results of one multiplier of the N multipliers to obtain the second computation result; and accumulating the N second computation results to obtain the result of the convolution by the second accumulator.

14. The method according to claim 11, wherein a number of the plurality of multipliers is P, where 16≤P≤256, and P is a positive integer.

* * * * *